April 26, 1960     D. S. JENNEY     2,934,151
HELICOPTER ROTOR
Filed Feb. 24, 1958
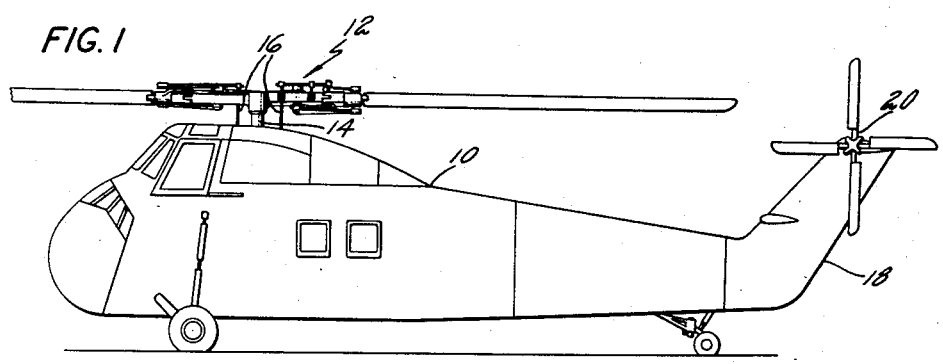
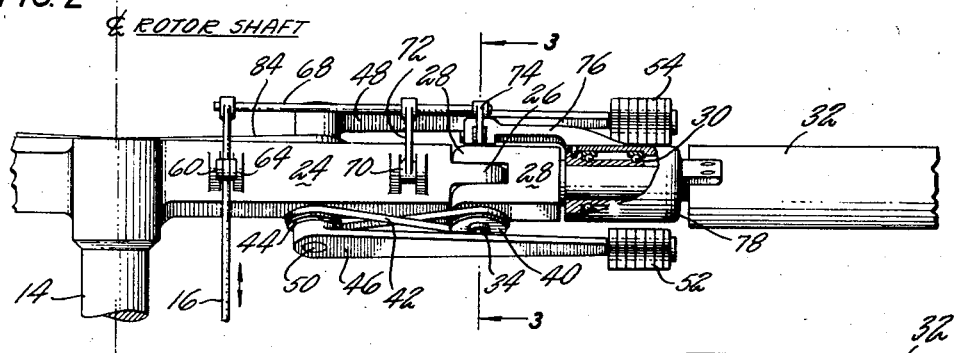
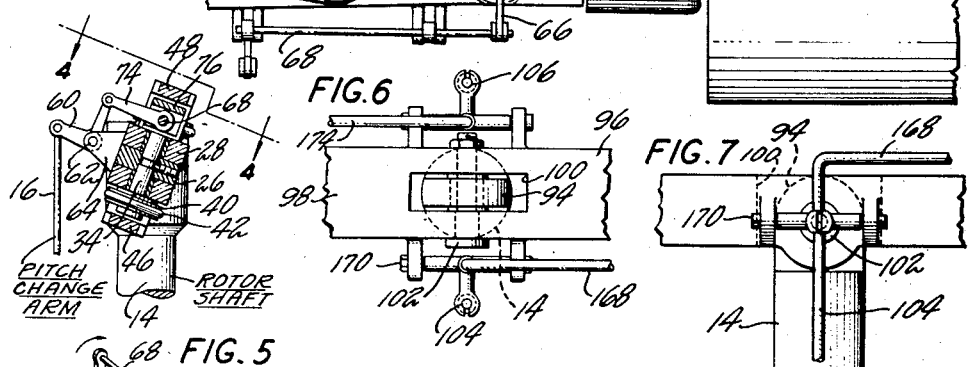
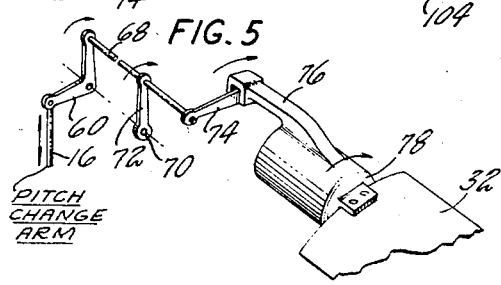
INVENTOR
DAVID S. JENNEY
BY Leonard F. Welland
ATTORNEY United States Patent Office 2,934,151
Patented Apr. 26, 1960

2,934,151

HELICOPTER ROTOR

David S. Jenney, Manchester, Conn., assignor to United Aircraft Corporation, East Hartford, Conn., a corporation of Delaware Application February 24, 1958, Serial No. 716,962

9 Claims. (Cl. 170—160.13)

This invention relates to helicopter rotor systems and more particularly to rotors having a once-per-revolution lead-lag motion of the blades.

It is an object of this invention to increase the maximum forward speed of helicopters by providing a temporary lag motion of the advancing rotor blade and a temporary lead motion of the retreating blade substantially in the plane of rotation of the rotor.

The rotor system of this invention has offset hinges inclined so as to allow simultaneous flapping and lagging motions. It is the purpose of this arrangement to increase the forward speed capabilities of a rotor by providing automatic lagging motion of the rotor blades on the advancing side of the disc and a leading motion on the retreating blades. The blade operating in the increased relative wind of the advancing side will experience more lift than the retreating blade and will tend to flap upward. If the natural frequency of the blade oscillation is equal to the rotor speed, the displacement resulting from such a moment will occur a quarter of a revolution after the force is applied. On a conventional rotor, this condition results in maximum upward flapping at the front of the rotor. If the rotor blade were hinged so that it was required to lag back several degrees for each degree it flapped upward, maximum leading of the blade would occur at the rearward position.

A flapping blade with no hinge offset naturally flaps to completely eliminate one-per-revolution variations of the flapping moment. In doing this, however, at high forward speeds, large angles of attack are created on the retreating side of the rotor by the large flapping velocities, and stall results. This system, in forcing the blades to lag backward as they flap upward, equalizes the lift on the advancing and retreating blades by both changing the angles of attack with flapping and changing the relative wind speed with lagging motion. When the blade moves up and back, the relative angle of attack during this motion is decreased while simultaneously the relative wind speed is decreased. However, the actual blade pitch remains the same. Therefore, smaller variations of local angle of attack are required at a particular forward speed, and it is possible to postpone stalling of the blades to a considerably higher forward speed.

The blade motions described above are characteristic of a resonant system. A simple flapping rotor blade flaps at 1/rev. if it has no hinge offset. A simple lagging rotor lags at 1/rev. if it has a 40 percent hinge offset. This rotor in order to flap and lag at 1/rev. should have an offset and mass distribution defined by the equation, $$Mx_c e = I \cos^2 \gamma$$

where $\gamma$ is the angle between the hinge pin and the direction of the rotor shaft $I$ = moment of inertia of the blade about the tilted flapping hinge $M$ = total blade weight $e$ = the distance from the rotor axis to the blade hinge in feet $x_c$ = distance from blade hinge to blade center of gravity The amount of rotor blade offset required should be between 30 and 40 percent of the rotor radius depending on the mass distribution and the ratio of blade flapping to blade lagging motion as determined by the hinge angle, $\gamma$. Hinge offset is defined as the spanwise position of the blade flapping hinges relative to the rotor axis.

Rotors having offset, cocked blade lag hinges have been proposed previously, but they were not intended to have large amplitudes of motion and were not designed to tolerate such motions. If large flapping and lagging amplitudes are to be employed, each blade must be matched with a counterweight having the same weight moment about its cocked hinge as does the blade. Such counterweights are shown as being connected to the blades so that they will be forced to move, as required, an amount equal and opposite to the blade motion. To minimize the stresses in the drive mechanisms between the blades and counterweights, the counterweights as well as the blades should be tuned to oscillate at their natural frequency. The counterweight can be hinged, as shown and described hereinafter, inboard of the blade hinge so its moment of inertia need not be as great as that of the blade for the tuning condition to be satisfied $$(Mx_c e = I \cos^2 \gamma)$$

The above objects and advantages will be more fully understood from the following detailed description of the drawing in which:

Fig. 1 is a side view of a typical helicopter having a rotor system according to this invention;

Fig. 2 is an enlarged detail in partial section illustrating the tilted hinge and pitch change mechanism;

Fig. 3 is a detailed cross section taken along the line 3—3 of Fig. 2 to show the tilted hinge;

Fig. 4 is a plan view of the hinge taken along the line 4—4 of Fig. 3;

Fig. 5 is a perspective view of the pitch change linkage;

Fig. 6 is a top view of a modified rotor head and blade version showing a means for permitting further flapping from a point adjacent the rotor shaft; and Fig. 7 is a side view of Fig. 6.

Referring to Fig. 1, a helicopter is shown as having a fuselage 10, a rotor system 12 driven by a drive shaft 14, and including pitch changing arms or links 16. The usual pylon 18 supports a tail rotor 20 to provide an antitorque control.

As seen in Fig. 2 the rotor shaft 14 includes two or more fixed spider arms 24 which carries a reduced ear 26. The ear 26 forms one part of a hinge formed by a second bifurcated hinge member 28 connected in turn to a bearing 30 which supports a blade 32 for pitch changing movements about the axis of the bearing 30.

As seen in both Figs. 2 and 3, the hinge formed by the members 26 and 28 includes a hinge pin 34 which is tilted with respect to the vertical axis of the rotor shaft 14 and in elevation only. In other words the hinge is tilted in elevation but is not in planform, i.e. the hinge line is tangent to a circle defined by the outboard end of the fixed arm 24 during rotation of the rotor. This tilted hinge causes the blade 32 to lag momentarily during its advancing movement in its plane of rotation at the same time that it is allowed to flap about the hinge pin 34. The hinge element 28 during its motion about the hinge pin 34 rotates a pulley 40, which via a cable 42, rotates a pulley 44 in the opposite direction. The pulley 44 is connected to a pair of arms 46 and 48 which are pivotable about a pivot pin 50. The free ends of the arms 46 and 48 each carries counterweights 52 and 54 which are moved in the opposite direction relative to the lagging (or leading) motion of the rotor blade as it rotates in the plane of rotation.

As seen in Figs. 2 and 3, a pitch change link 16 is connected to each of the blades 32 by means of a bell crank 60 which is pivoted at 62 to a pair of ears 64. The other end of the bell crank is connected to a rod 68 further hinged at 70 by means of a connecting rod 72. The rod 68 moves about the hinges 62 and 70 so as to move a pitch changing link 74 suitably connected to a yoke 76 fixed to the hub 78 of the blade 32. Movement of the yoke 76 provides blade pitch change about the axis of the bearings 30. The link 74 and the left end of the yoke 76 terminate substantially on the axis of the tilted hinge formed by the members 28 and 26 such that any flapping and lagging motion about the hinge pin 34 will not affect the pitch of the blades as set through the pitch changing mechanisms. (See also Fig. 5.)

The pitch changing mechanism of this system may be similar to that shown and described in Patent No. 2,699,313, issued February 16, 1954, for Helicopter Rotor, to Ralph Lightfoot.

As seen in Figs. 2 and 4, the upper arm 48 which carries the counterweight 54 also drives a pulley 82 which in turn moves a cable 84 which can be connected to a similar pulley and counterweight in the opposite blade such that a lagging motion of the advancing blade will introduce a leading motion in the retreating blade. This cable and pulley combination may be arranged in exactly the same way as pulleys 40 and 44 and cable 42 which connect blade and counterweight in Fig. 2.

As stated above with the configuration shown in Figs. 2 through 5, large rolling moments may be transmitted to the main rotor hub. Where these cannot be alleviated with the proper amount of cyclic pitch, it may be necessary to add some means to provide flapping from a point near the center of the rotor to eliminate these rolling moments. To this end and to simplify the showing, the rotor shaft 14 may be provided with a reduced semicircular head 94 which carries laterally extending blade roots 96 and 98 having an opening 100. The rotor shaft 94 extends into the opening 100 and a suitable pivot bolt 102 suitably bushed will permit rocking or tilting movement of the hub 98 about the pin 102. This hub 96 is otherwise equivalent to the spider arms 24 in Fig. 2. The vertical pitch changing arms 104 (see also Fig. 7) and 106 may also be provided. The pitch changing arm 104 will cause motion of the pitch changing rod 168 about a pivot 170. The pitch changing rod 168 is the equivalent of the pitch changing rod 68 of Figs. 2 through 5. The pitch changing rod 168 provides a pitch changing movement either for total pitch or cyclic pitch for the blade 96, while a comparable pitch changing rod 174 is moved by the pitch changing arm 106 for the blade 98.

Although only one embodiment of this invention has been illustrated and described herein, it will be apparent that various changes and modifications may be made in the construction and arrangement of the various parts without departing from the scope of this novel concept.

What is is desired by Letters Patent is:

1. In a helicopter having a main sustaining rotor, said rotor having a pair of blades, hinge means for each of said blades for automatically causing a lagging motion in the rotary motion in the advancing blade upon a coning motion thereof as a result of the increase lift thereon, said hinge means having a hinge line at an acute angle with respect to the plane of rotation of the blades, counterweights operatively connected to said blades and movable in the plane of blade rotation and in the opposite direction of the lead motion of said blades, and connecting means between an advancing blade and a retreating blade for automatically causing the retreating blade to lead in its rotary motion when the advancing blade lags.

2. In a helicopter having a main sustaining rotor, said rotor having a plurality of blades, hinge means for each of said blades for automatically causing a lagging in its rotary motion in the advancing blade upon a coning motion thereof as a result of the increase lift thereon, said hinge means being tilted in only a vertical plane, connecting means between the advancing blade and a retreating blade for automatically causing the retreating blade to lead in its rotary motion when the advancing blade lags, and counterweights operatively connected to said blades and movable in the plane of blade rotation, said counterweights being movable in the opposite direction of the lead and lag motion of said blades.

3. In a helicopter having a main sustaining rotor, said rotor having a pair of blades, offset hinge means for each of said blades for automatically causing a lagging in the rotary motion in the advancing blade upon a coning motion thereof as a result of the increase lift thereon, said hinge means being tilted in only one plane, means interconnecting said blades for automatically causing the retreating blade to temporarily lead in its rotary movement when the advancing blade lags, and counterweights operatively connected to each of said blades and movable in the plane of blade rotation, said counterweights movable in the opposite direction of the lead and lag motion of the respective blades.

4. In a helicopter having a main sustaining rotor, said rotor having a pair of blades, offset hinge means for each of said blades for automatically causing a lagging in the rotary motion in the advancing blade upon a coning motion thereof as a result of the increase lift thereon, means interconnecting said blades for automatically causing the retreating blade to temporarily lead in its rotary movement when the advancing blade lags, counterweights operatively connected to each of said blades and movable in the plane of blade rotation, said counterweights movable in the opposite direction of the lead and lag motion of the respective blades, bearing means outboard of said hinge means for supporting the outboard portion of said blades for pitch changing movement about the spanwise axis of the blades, and means extending from a point inboard of said hinge means and to a point outboard thereof for varying the pitch of said blades.

5. In a helicopter having a main sustaining rotor, said rotor having a pair of blades, flapping hinge means for each of said blades for automatically causing a lagging in the rotary motion in the advancing blade upon a coning motion thereof as a result of the increase lift thereon, the hinge line of said hinge means being at an angle relative to the plane of rotation of said blades and being located outboard along the blade span approximately 30% to 40% of the rotor radius, means interconnecting said blades for automatically causing the retreating blade to temporarily lead in its rotary movement in the plane of rotation when the advancing blade lags, a counterweight operatively connected to each of said blades and movable in the plane of blade rotation, said counterweights movable in the opposite direction of the lead and lag motion of the respective blades and being tuned with respect to the blade, and means for varying the pitch of said blades including operative connections to the said blades outboard of said hinge means.

6. In a helicopter having a main sustaining rotor, said rotor having a least two blades, said blades comprising a rigidly mounted inboard portion and an outboard portion, flapping hinge means for each of said blades for connecting said inboard and outboard portions, said hinge means automatically causing a lagging in the rotary motion in the advancing blade upon a coning motion thereof as a result of the increase lift thereon, the hinge line of said hinge means being at an angle relative only to the plane of rotation of said blades but being tangent to a circle defined by the outboard end of said inboard blade portion during rotation of the rotor, said hinge means being located outboard along the blade span approximately according to the equation, $$Mx_c e = I \cos^2 \gamma$$

where $\gamma$ = the angle between the hinge pin and the direction of the rotor shaft
$I$ = moment of inertia of the blade about the tilted flapping hinge
$M$ = total blade weight
$x_c$ = distance from blade hinge to blade center of gravity
$e$ = the distance from the rotor axis to the blade hinge means interconnecting said blades for automatically causing the retreating blade to temporarily lead in its rotary movement in the plane of rotation when the advancing blade lags, and means for varying the pitch of said blades including operative connections to the said blades outboard of said hinge means.

7. In a helicopter having a main sustaining rotor, said rotor having at least two blades, said blades comprising a rigidly mounted inboard portion and an outboard portion, flapping hinge means for each of said blades for connecting said inboard and outboard portions, said hinge means automatically causing a lagging in the rotary motion in the advancing blade upon a coning motion thereof as a result of the increase lift thereon, the hinge line of said hinge means being at an angle relative only to the plane of rotation of said blades but being tangent to a circle defined by the outboard end of said inboard blade portion during rotation of the rotor, said hinge means being located outboard along the blade span approximately according to the equation, $$Mx_c e = I \cos^2 \gamma$$

where $\gamma$ = the angle between the hinge pin and the direction of the rotor shaft
$I$ = moment of inertia of the blade about the tilted flapping hinge
$M$ = total blade weight
$x_c$ = distance from blade hinge to blade center of gravity
$e$ = the distance from the rotor axis to the blade hinge means interconnecting said blades for automatically causing the retreating blade to temporarily lead in its rotary movement in the plane of rotation when the advancing blade lags, a counter-weight operatively connected to each of said blades and movable in the plane of blade rotation, said counterweights movable in the opposite direction of the lead and lag motion of the respective blades and being tuned with respect to the blade, means for varying the pitch of said blades including operative connections to the said blades outboard of said hinge means.

8. In a helicopter having a main sustaining rotor, said rotor having a pair of blades, first flapping hinge means for each of said blades for automatically causing a lagging in the rotary motion in the advancing blade upon a coning motion thereof as a result of the increase lift thereon, the hinge line of said hinge means being at an angle relative to the plane of rotation of said blades and being located outboard along the blade span from the rotor axis approximately 30% to 40% of the rotor radius, means interconnecting said blades for automatically causing the retreating blade to temporarily lead in its rotary movement in the plane of rotation when the advancing balde lags, a counterweight operatively connected to each of said blades and movable in the plane of blade rotation, said counterweights movable in the opposite direction of the lead and lag motion of the respective blades and being tuned with respect to the blade, each of said counterweights being carried by an arm pivotally mounted on said blade inboard of said hinge means, each said counterweight being carried by the free end of said arm and located outboard of said hinge, a connection between said arm and the flapping portion of said blade, and means for varying the pitch of said blades including operative connections to the said blades outboard of said hinge means.

9. In a helicopter having a main sustaining rotor, said rotor having a pair of blades, first flapping hinge means for each of said blades for automatically causing a lagging in the rotary motion in the advancing blade upon a coning motion thereof as a result of the increase lift thereon, the hinge line of said hinge means being at an angle relative to the plane of rotation of said blades and being located outboard along the blade span from the rotor axis approximately 30% to 40% of the rotor radius, means interconnecting said blades for automatically causing the retreating blade to temporarily lead in its rotary movement in the plane of rotation when the advancing blade lags, a counterweight operatively connected to each of said blades and movable in the plane of blade rotation, said counterweights movable in the opposite direction of the lead and lag motion of the respective blades and being tuned with respect to the blade, each of said counterweights being carried by an arm pivotally mounted on said blade inboard of said hinge means, each said counterweight being carried by the free end of said arm and located outboard of said hinge, a connection between said arm and the flapping portion of said blade, means for varying the pitch of said blades including operative connections to the said blades outboard of said hinge means, and means inboard of said first flapping hinge means permitting further flapping of said blades.

References Cited in the file of this patent

UNITED STATES PATENTS

| | | |
|---|---|---|
| 1,811,303 | Cierva | June 23, 1931 |
| 2,296,250 | Bennett | Sept. 22, 1942 |
| 2,397,154 | Platt | Mar. 26, 1946 |
| 2,425,650 | Stalker | Aug. 12, 1947 |
| 2,620,888 | Avery | Dec. 9, 1952 |
| 2,670,051 | Hohenemser | Feb. 23, 1954 |
| 2,721,615 | Pullin et al. | Oct. 25, 1955 |